March 11, 1930.    J. R. BARRY    1,750,343
AUTO SCREEN
Filed Jan. 12, 1929
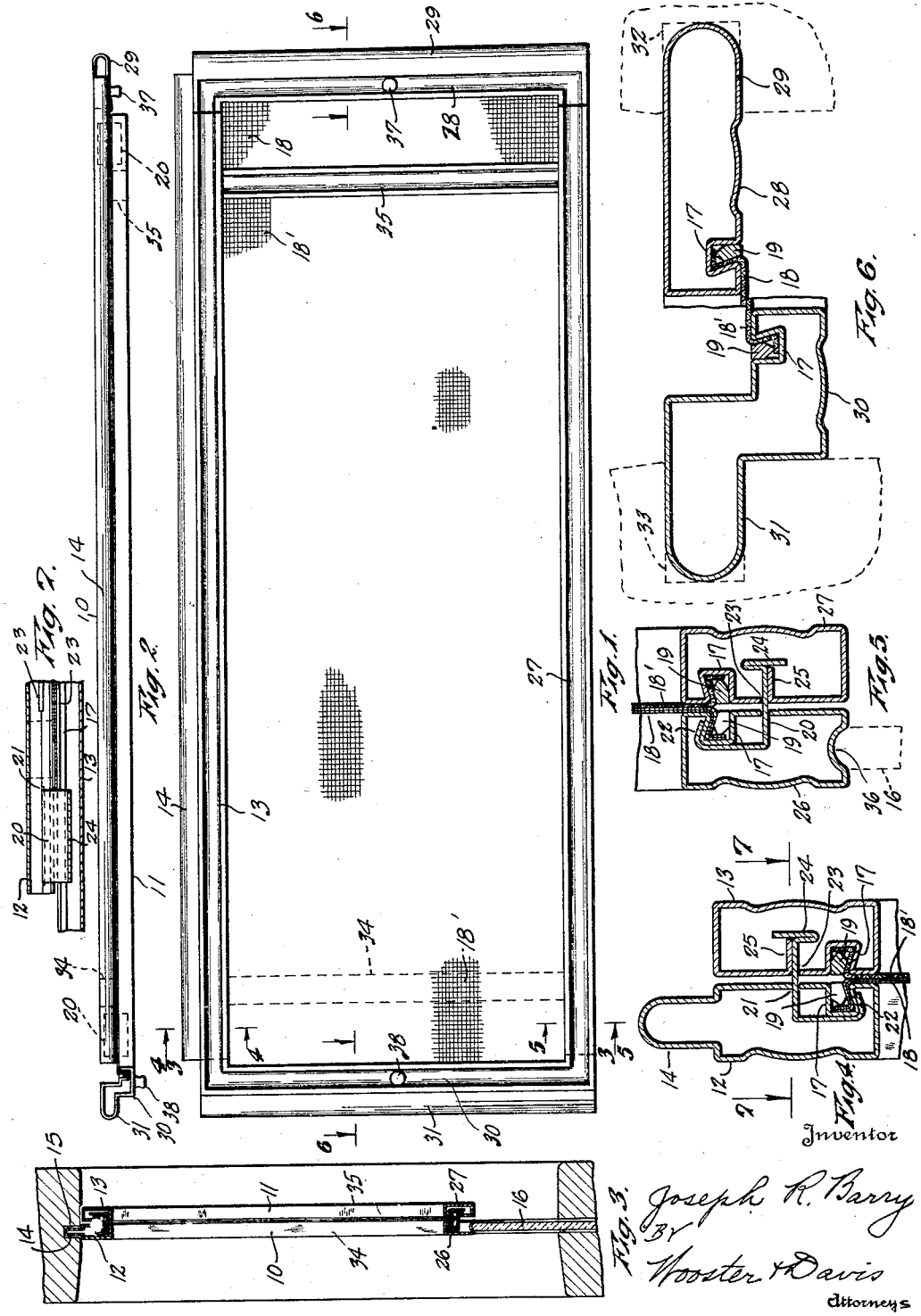

Patented Mar. 11, 1930

1,750,343

UNITED STATES PATENT OFFICE

JOSEPH R. BARRY, OF FAIRFIELD, CONNECTICUT

AUTO SCREEN

Application filed January 12, 1929. Serial No. 332,045.

This invention relates to screens, and more particularly to a screen for an automobile window, and it is an object of the invention to provide an improved screen construction which will be neat and attractive in appearance when in the window opening, which is so constructed that it is rigidly secured in this opening so that there is little likelihood of its accidentally falling out, to provide a screen which is easily adjustable to fit different sizes of openings, and in which a section may be shifted if it is desired to extend the arm for giving a signal.

With the foregoing and other objects in view, the invention consists in certain novel features of construction, combinations and arrangements of parts as will be more fully disclosed in connection with the accompanying drawing. In this drawing, Fig. 1 is a front elevation of the screen.

Fig. 2 is a top plan view thereof.

Fig. 3 is a vertical section substantially on line 3—3 of Fig. 1 showing the screen mounted in a window opening of an automobile.

Fig. 4 is a transverse detail section on an enlarged scale taken substantially on line 4—4 of Fig. 1.

Fig. 5 is a detail section taken substantially on line 5—5 of Fig. 1.

Fig. 6 is a transverse section of the end bars substantially on line 6—6 of Fig. 1, and Fig. 7 is a detail longitudinal section taken substantially on line 7—7 of Fig. 4, but on a somewhat smaller scale.

The screen shown comprises two sections 10 and 11, each of which comprises a hollow sheet metal frame of improved construction, and these two sections are arranged in overlapping relation and connected by means which permits a relative longitudinally sliding movement to allow adjustment of the screen to fit different sized window openings, and also to permit shifting of one section when in the car to permit extension of a hand for a signal or any other reason desired.

Fig. 4 shows a cross section on a somewhat enlarged scale of the two upper bars of the frames of the screen. Both of these bars are hollow bars of sheet metal, the bar 12 being on the section 10 and the bar 13 on the section 11. The bar 12 is shaped to form a longitudinal rib 14 which is adapted to seat in the groove 15 for the upper edge of the glass 16 in the top of the window opening. The bar is bent inwardly to form an offset 17 and provide a longitudinal groove to receive the edge of a wire mesh screen 18 which is inserted in the groove formed by the offset and held therein by a clamping bar 19 forced into the groove. The same means is provided on all of the bars of both frames for securing the mesh 18 and 18' in the frame. The offset 17 also provides means for securing in position the connecting element 20 for securing the two frames together. The wall of the bar 12 has an elongated opening 21 through which the member 20 is inserted and its inner end extends downwardly and is folded under the offset 17, as shown at 22. This member is thus permanently mounted in the bar. The bar 13 has a longitudinal slot 23 in its inner wall extending throughout substantially the length of the bar and through which extends the other portion of the member 20 which is bent downwardly and then upwardly upon itself, as shown at 24, to engage the inner edge of the inwardly extending flange 25. The upright end 24 is guided against the edge of this flange, and the member 20, although permanently secured to the bar 12, is guided for longitudinal movement in the slot 23. The member 20, therefore, secures the two bars together and permits relative longitudinal movement. The same connection is used at the other end of the screen, as shown at the right of Fig. 2, except that the member 20 is here fastened to the bar 13 and slides in a longitudinal slot in the bar 12. The same connections are used on the bottom bars 26 and 27 of the two frames, as shown in Fig. 5.

One end bar 28 of the section 10 is formed with a rib 29 to seat in one of the vertical guide grooves for the edge of the glass 16 at one end of the window opening, while the upright bar 30 of the other section 11 at the other end of the screen has an offset upright rib 31 to seat in the upright guide groove for the glass at the other end of the window opening. These two grooves are indicated in dotted lines at 32 and 33, respectively, Fig. 6. The other upright bar at the opposite end of the section 10 from the bar 28 is indicated in dotted lines at 34, while the other end bar of the section 11 opposite to the bar 30 is shown at 35. It will be seen from this that the longitudinal bars 12, 13, 26 and 27 extend somewhat beyond the upright bars 34 and 35 of their respective frames and it is in these overhangs the securing elements 20 are mounted.

In placing the screen in the window it is rested on the top edge of the glass 16, the bottom wall of the bar 26 being provided with a longitudinal groove 36 to receive the upper edge of this glass and hold the screen in position thereon. Then the operator by means of the handles 37 and 38 on the sections 10 and 11 respectively can slide the sections to bring the ribs 29 and 31 into the guide grooves for the glass at the opposite upright ends of the window opening. Then by merely raising the glass 16 by means of the usual glass operating mechanism, not shown, the screen is lifted with the glass and the upper longitudinal rib 14 is seated in the groove 15 at the top of the window opening. It will be obvious the screen is now rigidly mounted in the window opening and in such a manner that it cannot accidentally fall out and the felts in these guide grooves for the glass hold it against rattling. However, the operator may shift one of the sections longitudinally if for any reason it is desired to do so without disturbing the rest of the screen. Thus he may shift one of the sections if it is desired to throw anything out of the car or if he wishes to extend a hand for a signal. It will also be obvious that the sheet metal frame formed as illustrated makes a very rigid construction of light weight, and also makes a very attractive looking screen. The screen is also easily removed from the window by merely lowering the glass and then moving the sections longitudinally to withdraw their ribs 29 and 31 from the grooves at the opposite ends of the openings.

Having thus set forth the nature of my invention, what I claim is:

1. An automobile screen comprising two sections each having a frame, means for securing a sheet of wire screen to each frame, one of said sections having a longitudinal rib on the top bar of its frame to seat in a groove at the top of a window opening and an upright rib on one end bar to extend into the upright guide groove at one end of the window opening, the other section having an upright rib on its opposite end bar to extend into the upright groove at the opposite end of the opening, the bottom bar of the first section having a groove to receive the top edge of the glass, and means for securing the sections together for relative sliding movement longitudinally of the window opening.

2. An automobile screen comprising two sections each including a frame, a sheet of wire screen secured in each frame, one of said frames having a longitudinal rib on its top and a vertical rib on one end bar to seat in the grooves at the top and one end of a window opening respectively, the other frame having a vertical rib to seat in the glass guide groove at the opposite end of the opening, the bottom bar of one of said frames having a groove in its under side to seat on the upper edge of the window glass, and means for securing the frames together for relative sliding movement.

3. In an automobile screen, a pair of sections each including a frame comprising hollow sheet metal bars, the horizontal bars of the frames being provided with inwardly extending walls forming a groove to receive the edge of a screen and a securing element therefor, said bars being also provided with longitudinal slots, and securing means carried by the corresponding bar of the other frame extending through the side wall thereof and about the rib caused by the formation of said groove to secure it to the frame, said securing means also extending through the slot and having an upright wall in the latter bar to hold the frames together and permit relative sliding movement.

4. In an automobile screen, a pair of sections each including a frame comprising hollow sheet metal bars, said sections being arranged with a bar of each section side by side, one of said bars being provided with a longitudinal slot in its side wall and the wall at one side of said slot being extended inwardly to form a strengthening guide flange, and a securing element carried by the other bar extending into said slot and having an upright wall engaging the edge of said flange for sliding movement.

In testimony whereof I affix my signature.

JOSEPH R. BARRY.